(12) United States Patent
Hung

(10) Patent No.: US 7,264,212 B2
(45) Date of Patent: Sep. 4, 2007

(54) MONITOR-HOLDING DEVICE

(76) Inventor: Chin-Jui Hung, No. 11-2, Wu-Nan Rd., Wu-Chi Chen, Taichung Hsien (TW)

( * ) Notice: Subject to any disclaimer, the term of this patent is extended or adjusted under 35 U.S.C. 154(b) by 114 days.

(21) Appl. No.: 11/133,533

(22) Filed: May 20, 2005

(65) Prior Publication Data

US 2006/0261228 A1   Nov. 23, 2006

(51) Int. Cl.
*E04G 3/00* (2006.01)
(52) U.S. Cl. ............... 248/282.1; 248/184.1; D14/452
(58) Field of Classification Search ............ 248/282.1, 248/278.1, 276.1, 184.1, 918; D14/452
See application file for complete search history.

(56) References Cited

U.S. PATENT DOCUMENTS

| | | | | |
|---|---|---|---|---|
| 1,002,783 A | * | 9/1911 | Sweet | 248/282.1 |
| 1,220,578 A | * | 3/1917 | Wise | 108/139 |
| 2,500,048 A | * | 3/1950 | Stoiber | 248/184.1 |
| 4,562,987 A | * | 1/1986 | Leeds et al. | 248/278.1 |
| 4,690,285 A | * | 9/1987 | Stone | 211/70.6 |
| 5,201,896 A | * | 4/1993 | Kruszewski | 248/278.1 |
| 5,429,336 A | * | 7/1995 | Ko | 248/278.1 |
| 5,772,174 A | * | 6/1998 | Hirsch et al. | 248/447.1 |
| 6,554,238 B1 | * | 4/2003 | Hibberd | 248/278.1 |
| 6,729,592 B1 | * | 5/2004 | Kurtts | 248/278.1 |
| 6,758,454 B2 | * | 7/2004 | Smed | 248/314 |
| 6,857,610 B1 | * | 2/2005 | Conner et al. | 248/284.1 |
| 6,863,252 B2 | * | 3/2005 | Bosson | 248/278.1 |
| D503,719 S | * | 4/2005 | Lin | D14/452 |
| 7,000,878 B2 | * | 2/2006 | Lin | 248/276.1 |
| D522,009 S | * | 5/2006 | Chen | D14/452 |
| 2004/0251389 A1 | * | 12/2004 | Oddsen, Jr. | 248/279.1 |

* cited by examiner

*Primary Examiner*—Anita M. King
(74) *Attorney, Agent, or Firm*—William E. Pelton, Esq.; Cooper & Dunham LLP

(57) ABSTRACT

A monitor-holding device is attached to a table, holds a monitor and has a vertical support, a shoulder joint, an inner arm, an elbow joint (40), an outer arm, a universal joint and a monitor bracket. The shoulder joint is attached to the vertical support. The inner arm is connected pivotally to the shoulder joint. The elbow joint is connected rotatably to the inner arm. The outer arm is connected to the elbow joint and pivots relative to the inner arm. The universal joint is connected pivotally to the outer arm and has an inner joint, an outer joint and a connector bracket connected to the outer joint. The monitor bracket has a monitor connector detachably connected to the connector bracket and has multiple fingers connected to the monitor. The monitor with the monitor bracket can be easily detached from or attached to the connector bracket.

10 Claims, 11 Drawing Sheets

MONITOR-HOLDING DEVICE

BACKGROUND OF THE INVENTION

1. Field of the Invention

The present invention relates to a holding device, and more particularly to a monitor-holding device that is attached to a table and has a detachable monitor bracket to hold a monitor. The monitor can be detached quickly from the monitor-holding bracket without detaching the entire monitor-holding device.

2. Description of Related Art

Liquid crystal displays (LCD) are used popularly in many fields such as offices, bus stations, hospitals, etc. To mount a monitor on a wall or a table, a conventional monitor bracket has a distal end and is attached to a wall or table. Multiple bolts extend through the distal end of the monitor bracket and screw into the monitor to connect the monitor to the monitor bracket. However, the suspended monitor is not easily detached from the monitor bracket. To detach the suspended monitor, the entire monitor bracket may need to be detached first.

Another conventional monitor bracket is articulated and has an inner arm and an outer arm. The inner arm is attached to a wall or table. The outer arm is attached pivotally to the inner arm at a joint and has a distal end connected to a monitor. However, the joint between the outer arm and the inner arm wears when the joint is bent to adjust the position of the monitor and becomes too weak to hold the monitor in position.

To overcome the shortcomings, the present invention provides a monitor-holding device to mitigate or obviate the aforementioned problems.

SUMMARY OF THE INVENTION

The main objective of the invention is to provide a monitor-holding device for holding a monitor, which has a detachable monitor bracket. The monitor can be detached quickly from the monitor-holding bracket without detaching the entire monitor-holding device.

A monitor-holding device in accordance with the present invention is attached to a table, holds a monitor and comprises a vertical support, a shoulder joint, an inner arm, an outer arm, a universal joint and a monitor bracket.

The shoulder joint is attached to the vertical support.

The inner arm is connected pivotally to the shoulder joint.

The elbow joint is connected rotatably to the inner arm.

The outer arm is connected to the elbow joint and pivots relative to the inner arm.

The universal joint is connected pivotally to the outer arm and has an inner joint, an outer joint and a monitor connector connected to the outer joint.

The monitor bracket has a monitor connector detachably connected to the connector bracket and has multiple fingers connected to the monitor.

Other objectives, advantages and novel features of the invention will become more apparent from the following detailed description when taken in conjunction with the accompanying drawings.

BRIEF DESCRIPTION OF THE DRAWINGS

FIG. 6A is an enlarged top view in partial section of the elbow joint of the monitor-holding device in FIG. 6;

FIG. 7A is an enlarged operational top view in partial section of the outer arm joint of the monitor-holding device in FIG. 7;

DETAILED DESCRIPTION OF PREFERRED EMBODIMENT

Figure 1:
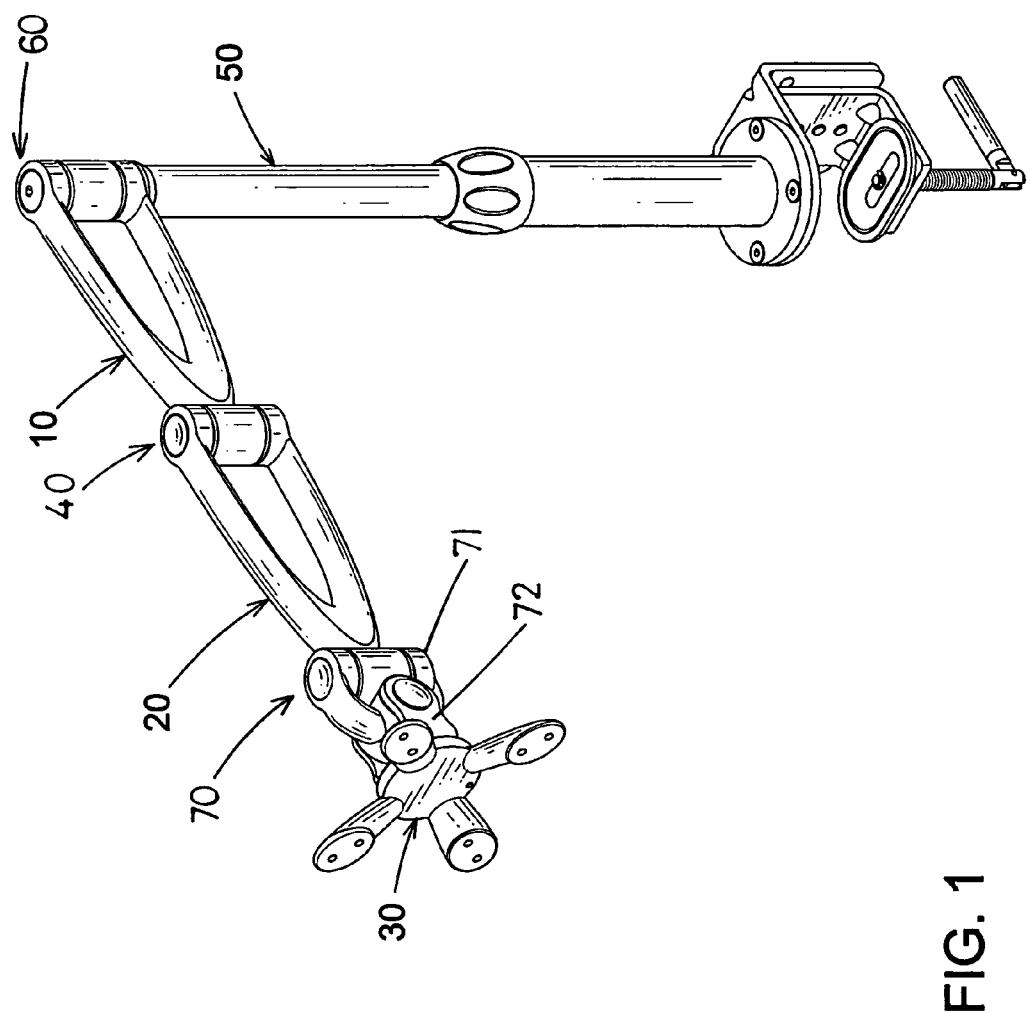
FIG. 1 is a perspective view of a monitor-holding device in accordance with the present invention.
Figure 2:
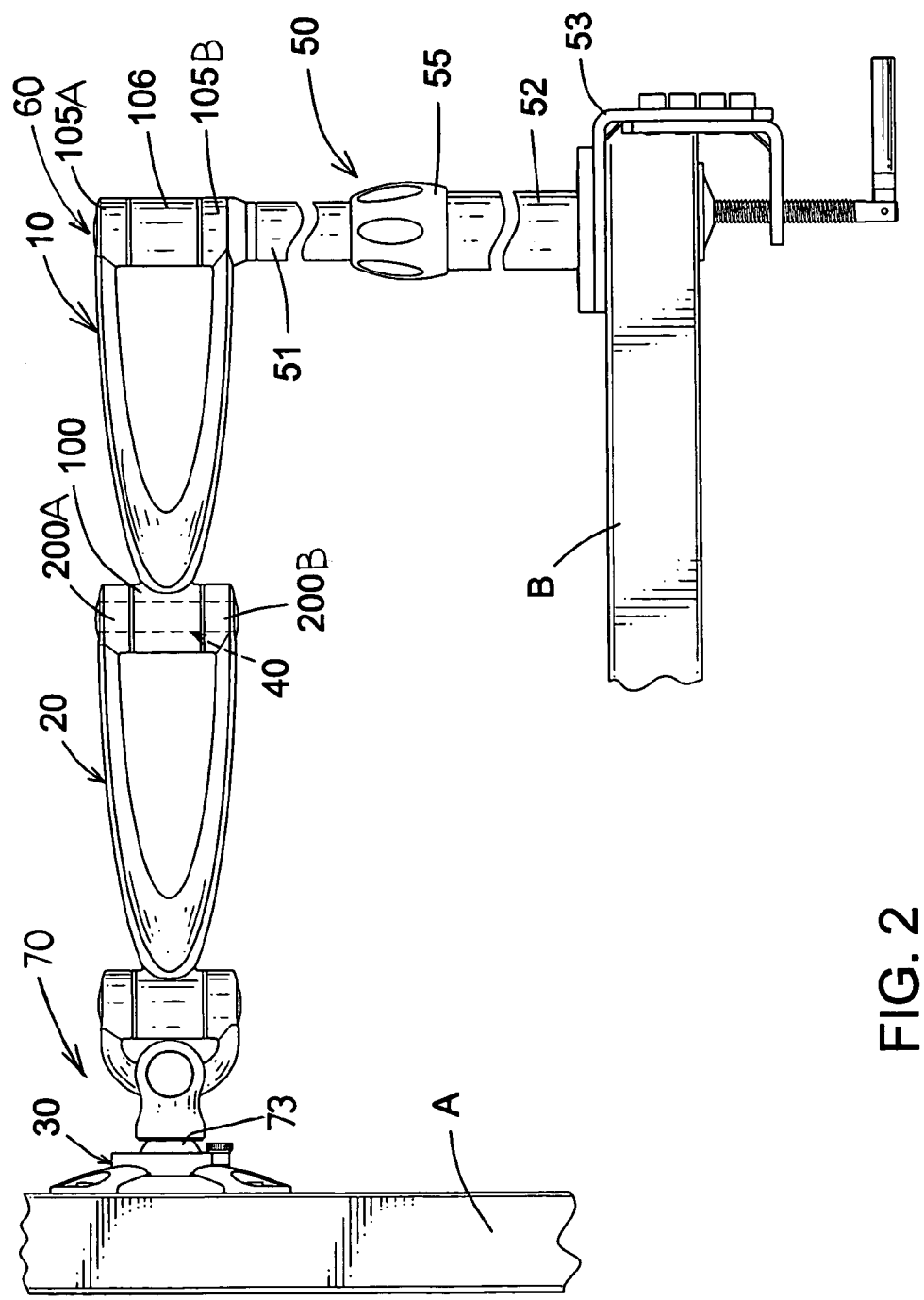
FIG. 2 is an enlarged side view of the monitor-holding device in FIG. 1 mounted on a table and to which a monitor is mounted.

With reference to FIGS. 1 and 2, a monitor-holding device in accordance with the present invention is attached to a table (B), holds a monitor (A) such as a liquid crystal display and comprises a vertical support (50), a shoulder joint (60), an inner arm (10), an elbow joint (40), an outer arm (20), a universal joint (70) and a monitor bracket (30).

Figure 3:
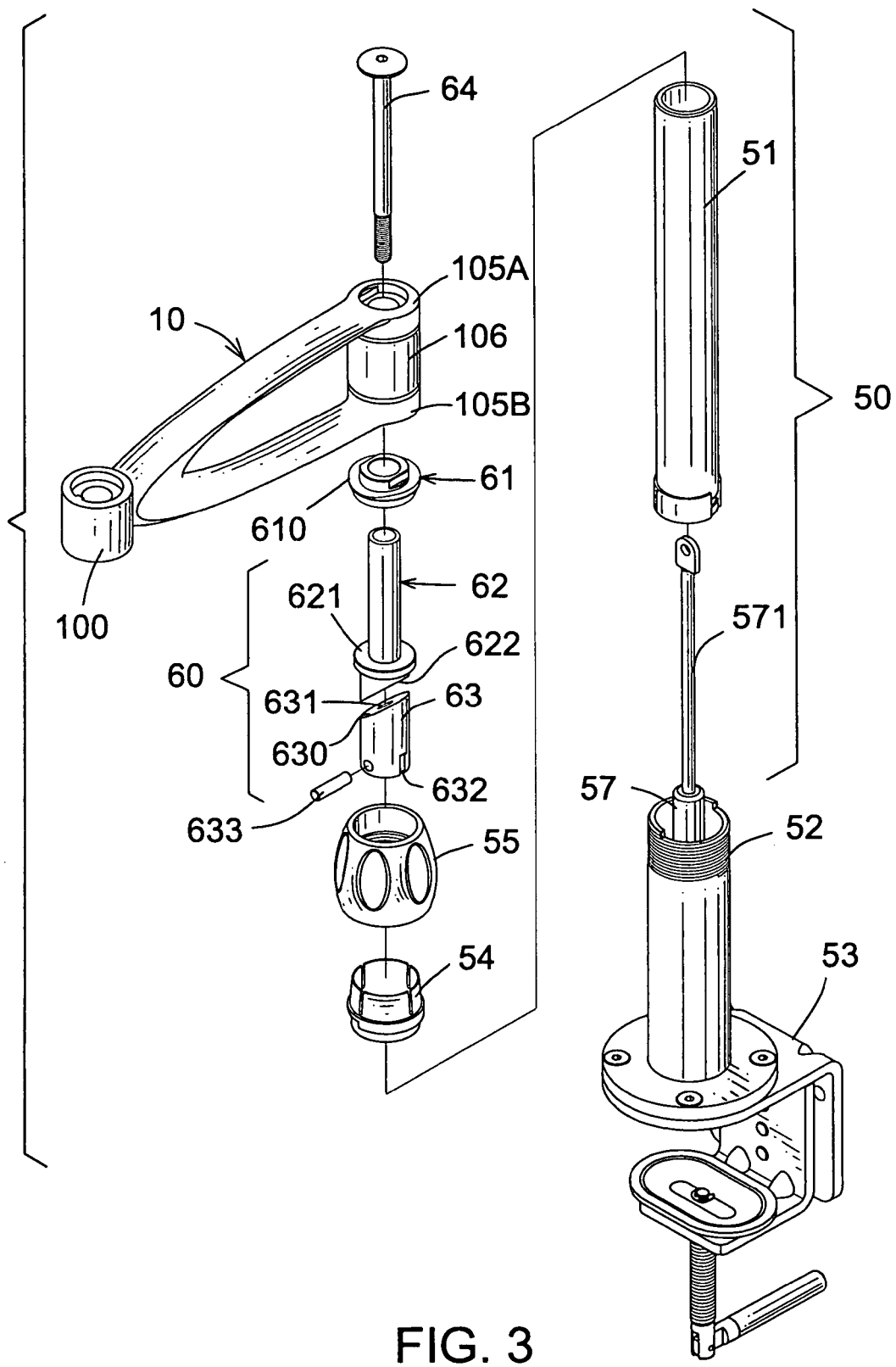
FIG. 3 is an exploded perspective view of a vertical support, an inner-arm joint and an inner arm of the monitor-holding device in FIG. 1.
Figure 4:
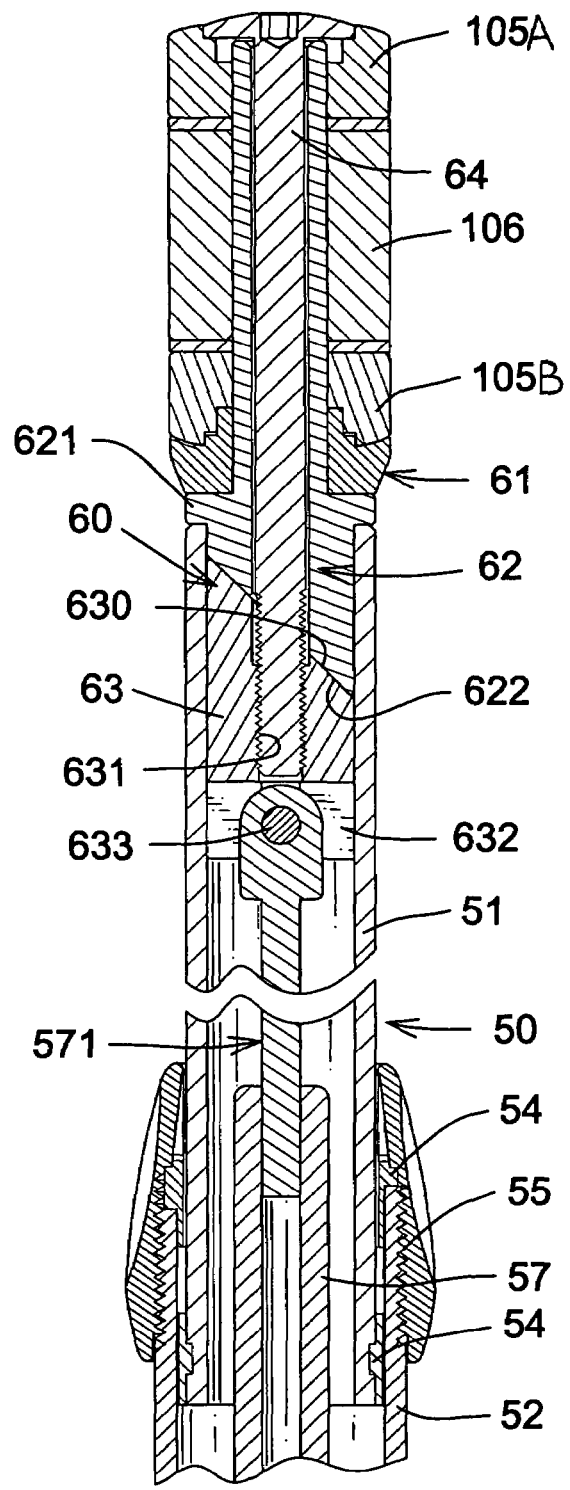
FIG. 4 is a cross-sectional side view of the vertical support and the inner-arm joint of the monitor-holding device in FIG. 1.

With further reference to FIGS. 3 and 4, the vertical support (50) has a top end, a bottom end and a clamp (53). The clamp (53) is attached to the bottom end of the vertical support (50) and clamps a table (B) to hold the vertical support (50) upright. The clamp may be conventional and is not described further.

The vertical support (50) can be implemented with an outer sleeve (52), a pneumatic cylinder (57), an inner sleeve (51), a compression collar (54) and a compression nut (55).

The outer sleeve (52) has a bottom end, a top end, a central hole and an outer thread. The bottom end is attached to the clamp (53). The outer thread is formed on the outer sleeve (52) close to the top end.

The pneumatic cylinder (57) is hollow, is mounted in the outer sleeve (52) and has a shaft (571). The shaft (571) has a proximal end, a distal end and a pivot tab. The proximal end of the shaft (571) is held in the pneumatic cylinder (57) with a vacuum force in the pneumatic cylinder (57). The pivot tab is formed on the distal end of the shaft (571) and has a pin hole defined through the pivot tab.

The inner sleeve (51) is mounted in the outer sleeve (52) around the pneumatic cylinder (57) and has a top end and a through hole defined through the inner sleeve (51).

The compression collar (54) is mounted around the inner sleeve (51) between the inner sleeve (51) and the outer sleeve (52) to hold the inner sleeve (51) in position in the outer sleeve (52).

The compression nut (55) is mounted slidably around the inner sleeve (51), screws onto the outer thread on the outer sleeve (52), compresses the compression collar (54) and has an inner thread corresponding to the outer thread on the outer sleeve (52). When the compression nut (55) is screwed tightly onto the outer thread of the outer sleeve (52), the compression nut (55) squeezes the compression collar (54) tightly around the inner sleeve (51) to hold the inner sleeve (51) in place relative to the outer sleeve (52).

The shoulder joint (60) is attached to the top end of the vertical support (50). When the vertical support (50) is implemented as previously described, the shoulder joint (60) can be mounted through the inner sleeve (51), connected to the pneumatic cylinder (57) in the outer sleeve (52) and have a connector (63), a pivot post (62), a bushing (61) and a locking bolt (64).

The connector (63) is connected pivotally to the pivot tab on the shaft (571) of the pneumatic cylinder (57) in the outer sleeve (52) and has a top, a bottom, an inclined top surface (630), a threaded hole (631), a bottom slot (632), a pin hole and a pin (633). The threaded hole (631) is defined in the top of the connector (63). The bottom slot (632) is defined transversely through the bottom of the connector (63) and holds the pivot tab on the shaft (571) of the pneumatic cylinder (57). The pin hole is defined transversely through the connector (63) and communicates with the bottom slot (632). The pin (633) is mounted in the pin holes in the connector (63) and the pivot tab on the shaft (571).

The pivot post (62) is mounted in the inner sleeve (51), abuts the top of the connector (63) and has a bottom inclined surface (622), a through hole and an annular flange (621). The bottom inclined surface (622) corresponds to and abuts the top inclined surface (630) of the connector (63). The through hole is defined longitudinally through the pivot post (62). The annular flange (621) is formed around the pivot post (62) and abuts the top end of the inner sleeve (51). The bushing (61) is mounted rotatably around the pivot post (62) above the annular flange (621) and has a through hole and a top end (610) that has a keyed outside surface.

The locking bolt (64) is mounted in the through hole in the pivot post (62), screws into the threaded hole (631) in the connector (63) and has an outer end, an inner end, an enlarged head and an outer thread. The enlarged head is formed on the outer end, and the outer thread is formed on the locking bolt (64) at the inner end.

Figure 5:
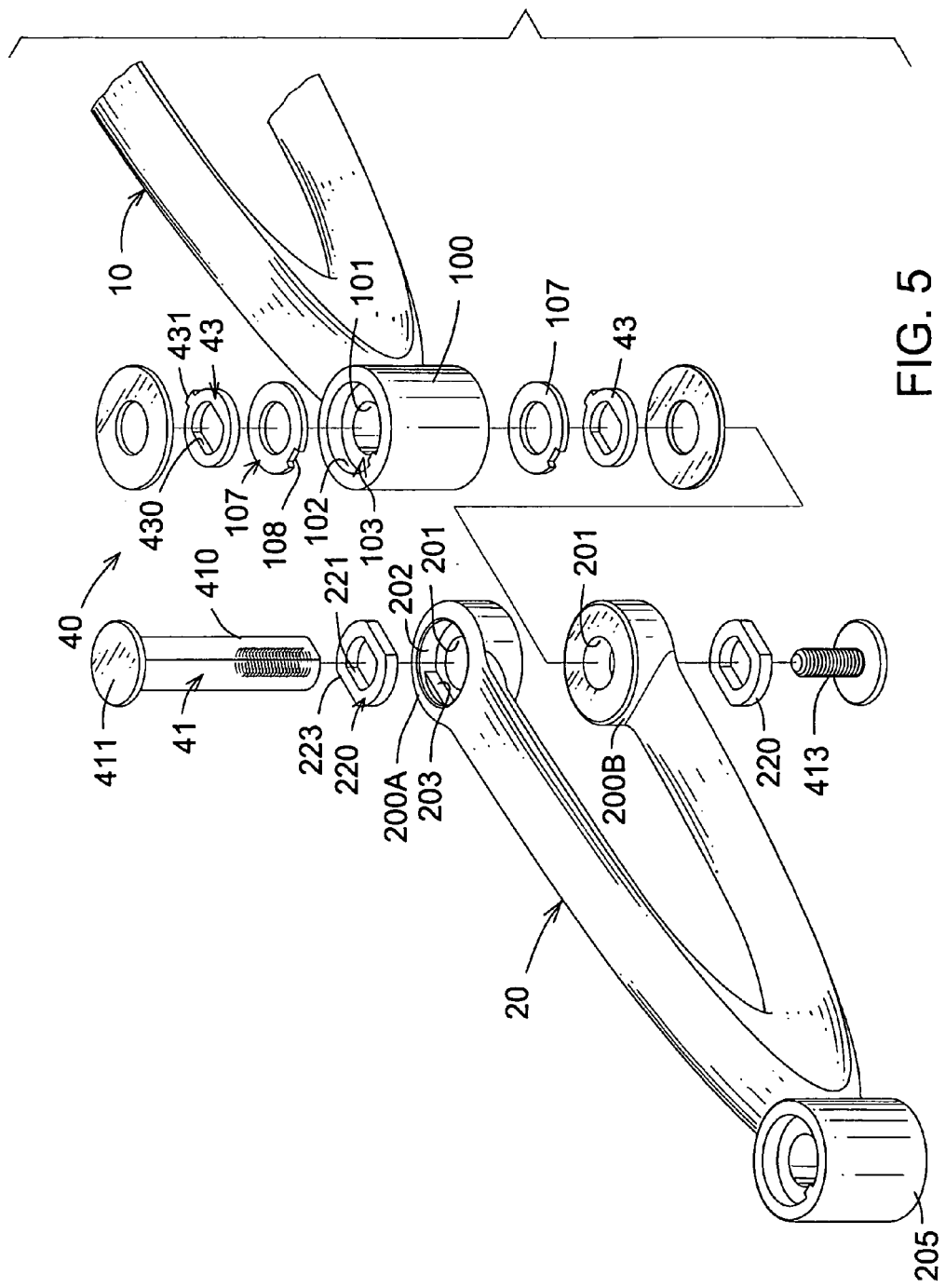
FIG. 5 is an exploded perspective view of the inner arm, an elbow joint and the outer arm of the monitor-holding device in FIG. 1.

With further reference to FIG. 5, the inner arm (10) is connected pivotally to the shoulder joint (60) and has a proximal end and a distal end. The proximal end is attached pivotally to the shoulder joint (60). The inner arm (10) may be V-shaped and may be mounted pivotally around the previously described implementation of the pivot post (62) of the shoulder joint (60).

The proximal end in this implementation is open and has an outer pivot ring (105A), an inner pivot ring (105B) and a spacer (106).

The outer and inner pivot rings (105A, 105B) are aligned with each other and are mounted pivotally around the pivot post (62) of the shoulder joint (60). The outer pivot ring (105A) is held on the pivot post (62) by the enlarged head on the locking bolt (64), and the inner pivot ring (105B) engages the top end (610) of the bushing (61) of the shoulder joint (60). Each pivot ring (105A, 105B) has an outside end, a pivot hole and an outside recess. The pivot hole is defined through the pivot ring (105A, 105B) and allows the pivot ring (105A, 105B) to be mounted pivotally on the pivot post (62). The outside recess communicates with the pivot hole and has a keyed inside surface corresponding to the top end of the bushing (61) of the shoulder joint (60).

The spacer (106) is mounted around the pivot post (62) of the shoulder joint (60) between the pivot rings (105A, 105B) on the inner arm (10) and has a central hole through which the pivot post (62) of the shoulder joint (60) extends.

The distal end of the inner arm (10) in this implementation has a pivot sleeve (100) and two stationary washers (107).

The pivot sleeve (100) has two ends, a pivot hole (101), two recesses (102) and two keys (103). The pivot hole (101) is defined through the pivot sleeve (100). The recesses (102) are defined respectively in the ends of the pivot sleeve (100) and communicate with the pivot hole (100), and each recess (102) has an annular inside surface. The keys (103) are formed respectively on the annular inside surfaces of the recesses (102).

The stationary washers (107) are securely mounted respectively in the recesses (102) in the pivot sleeve (100) of the inner arm (10). Each stationary washer (107) has an outside surface, a pivot hole and a notch (108). The pivot hole is defined through the stationary washer (107). The notch (108) is defined in the outside surface and engages the key (103) in the corresponding recess (102) in the pivot sleeve (100) on the inner arm (10).

The elbow joint (40) is attached rotatably to the distal end of the inner arm (10). The elbow joint (40) as implemented with the previously described implementation of the inner arm (10) is mounted rotatably through the pivot sleeve (100) of the inner arm (10) and has two rotating limits (43) and a pivot pin (41).

Figure 6:
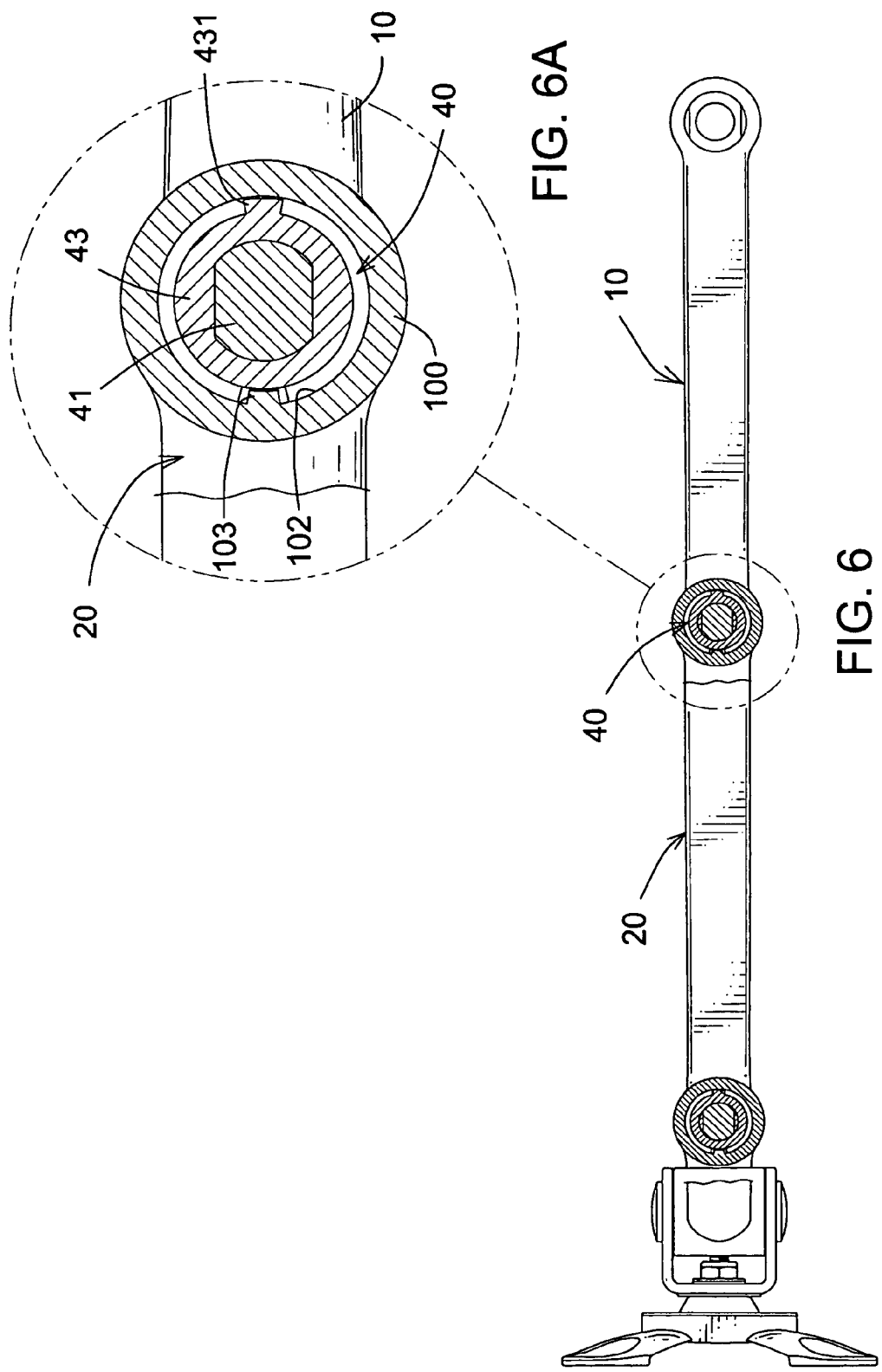
FIG. 6 is an operational top view in partial section of the monitor-holding device in FIG. 1 with the outer arm extended straight from the inner arm.
Figure 7:
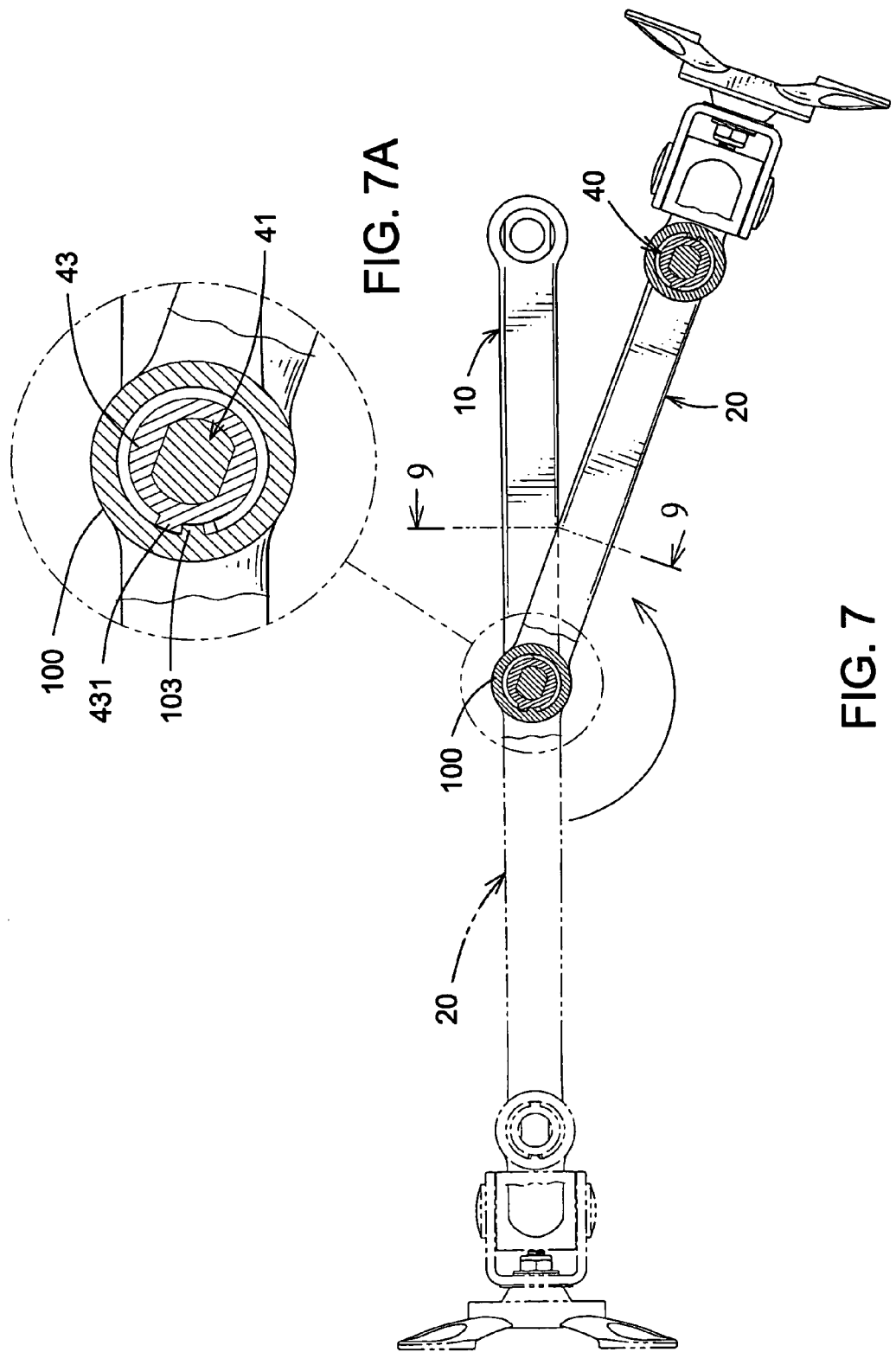
FIG. 7 is an operational top view in partial section of the outer arm joint of the monitor-holding device in FIG. 1 pivoted to an extreme position.
Figure 8:
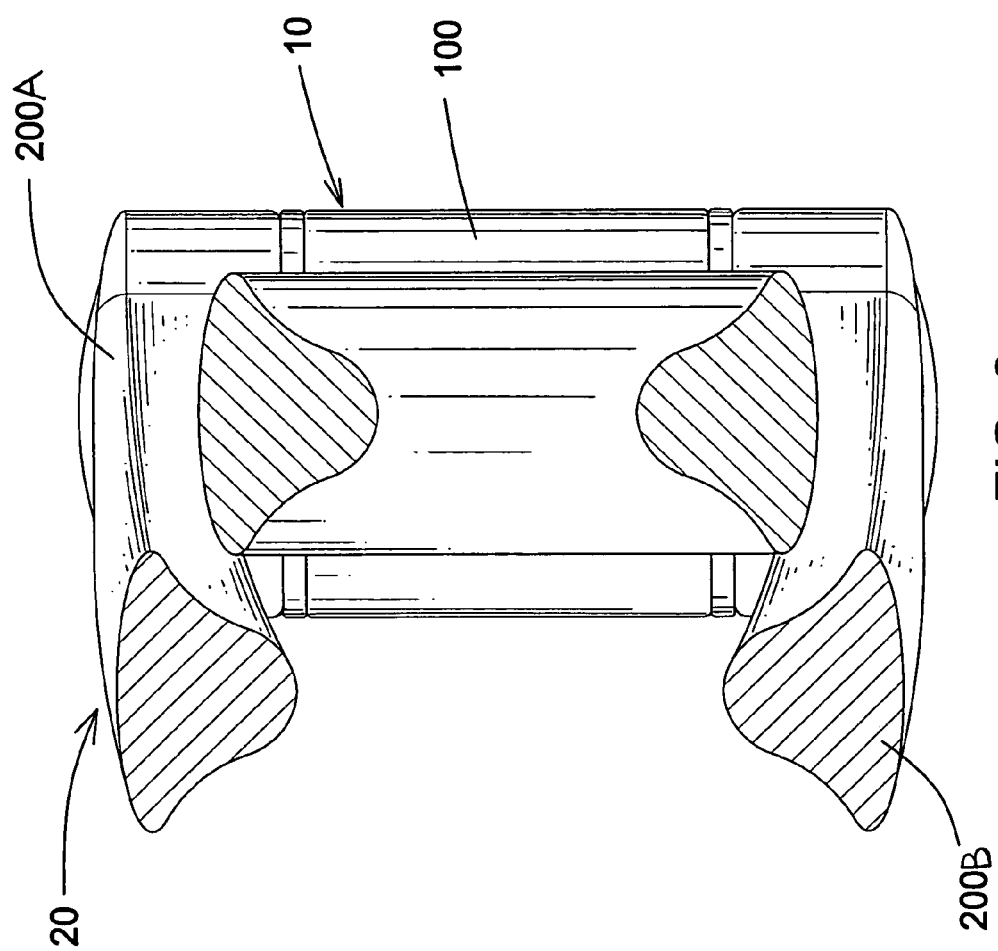
FIG. 8 is an operational perspective view in partial section of the outer arm and inner arm of the monitor-holding device in FIG. 7 pivoted to an extreme position.

The rotating limits (43) are rotatably mounted respectively in the recesses (102) in the pivot sleeve (100) of the inner arm (10). Each rotating limit (43) is ring-shaped and has an outside surface, a keyed inside surface (430), a mounting hole and a protrusion (431). With further reference to FIGS. 6 and 6A, the mounting hole is defined through the rotating limit (43). With further reference to FIGS. 7, 7A and 8, the protrusion (431) is formed on the outside surface and abuts the key (103) in the corresponding recess (103) in the pivot sleeve (100) to stop the rotating limit (43) from rotating any further.

The pivot pin (41) is mounted through mounting holes (430) in the rotating limits (43), is mounted rotatably through the pivot holes in the stationary washers (107) and the pivot hole (101) in the pivot sleeve (100) of the inner arm (10). The pivot pin (41) has two ends, a keyed outside surface, an enlarged head (411), a threaded hole (410) and a mounting bolt (413). The keyed outside surface of the pivot pin (41) corresponds to the keyed inside surfaces (430) of the rotating limits (43) so the rotating limits (43) rotate with the pivot pin (41) and keep the pivot pin (41) from rotating when the protrusions (431) abut the keys (103) in the recesses (102). The enlarged head (411) is formed on one end of the pivot pin (41). The threaded hole (410) is defined in the other end of the pivot pin (41). The mounting bolt (413) has an outer thread and screws into the threaded hole (410) in the pivot pin (41) to hold the pivot pin (41) in the pivot hole (101) in the inner arm (10).

The outer arm (20) is connected to the elbow joint (40), pivots relative to the inner arm (10) and has a proximal end and a distal end. The proximal end is attached pivotally to the elbow joint (40). The outer arm (20) may be V-shaped and may be mounted securely around the pivot pin (41) of the previously described implementation of the elbow joint (40).

The proximal end in this implementation is open and has an upper pivot ring (200A) and a lower pivot ring (200B).

The upper and lower pivot rings (200A, 200B) are aligned with each other, are mounted securely around the pivot pin (41) and are adjacent respectively to the ends of the pivot sleeve (100) on the inner arm (10). Each pivot ring (200A, 200B) has an outside end and a pivot hole (201). The pivot hole (201) is defined through the pivot ring (200A, 200B) and allows the pivot pin (41) to extend through the pivot hole (201).

In one implementation, each pivot ring (200A, 200B) has a keyed inside surface corresponding to the keyed outside surface of the pivot pin (41).

Alternatively, each pivot ring (200A, 200B) further has an outside recess (202) and a keyed washer (220). The outside recess (202) is defined in the outside end of the pivot ring (200A, 200B), communicates with the pivot hole (201) and has a keyed inside surface (203). The keyed washers (220) are securely mounted respectively in the outside recesses (202) in the pivot rings (200A, 200B) on the outer arm (20). Each keyed washer (220) has a central hole, a keyed inside surface (221) and a keyed outside surface (223). The central hole is mounted around the pivot pin (41) of the elbow joint (40). The keyed inside surface (221) corresponds to and is mounted around the keyed surface of the pivot pin (41). The keyed outer surface (223) corresponds to and is mounted in the keyed inside surface (203) in the outside recess (202) to cause the pivot pin (41) to rotate with the outer arm (20).

The distal end in this implementation has a pivot sleeve (205). The pivot sleeve (205) has the same structure as the pivot sleeve (100) on the distal end of the inner arm (10) is not further described.

Figure 9:
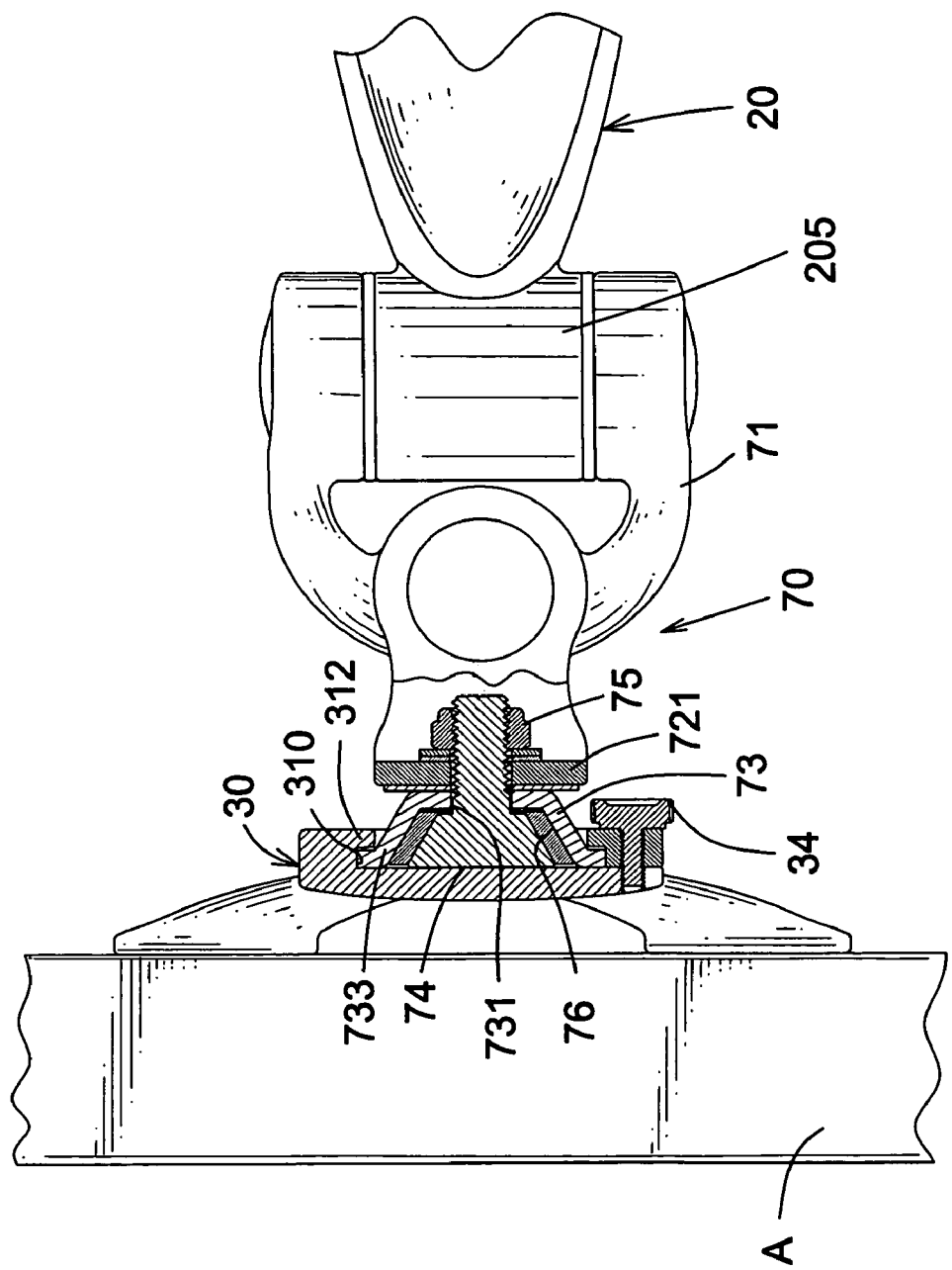
FIG. 9 is a side view in partial sectional of the universal joint and the monitor bracket of the monitor-holding device in FIG. 1.

With further reference to FIG. 9, the universal joint (70) is attached pivotally to the distal end of the outer arm (20) and has an inner joint (71), an outer joint (72), a connector bracket (73) and a fastener.

The inner joint (71) is U-shaped, is connected pivotally to the distal end of the outer arm (20) and to the pivot sleeve (205) on the outer arm (20) when the outer arm (20) is implemented as previously described.

The outer joint (72) is U-shaped, is connected pivotally to the inner joint (71), pivots perpendicular to the inner joint (71) and has a transverse member (721) and a mounting hole. The transverse member (721) has an inside surface and an outside surface. The inside surface faces the inner joint (71), and the outside surface is opposite to the inside surface. The mounting hole is defined longitudinally through the transverse member (721).

Figure 10:
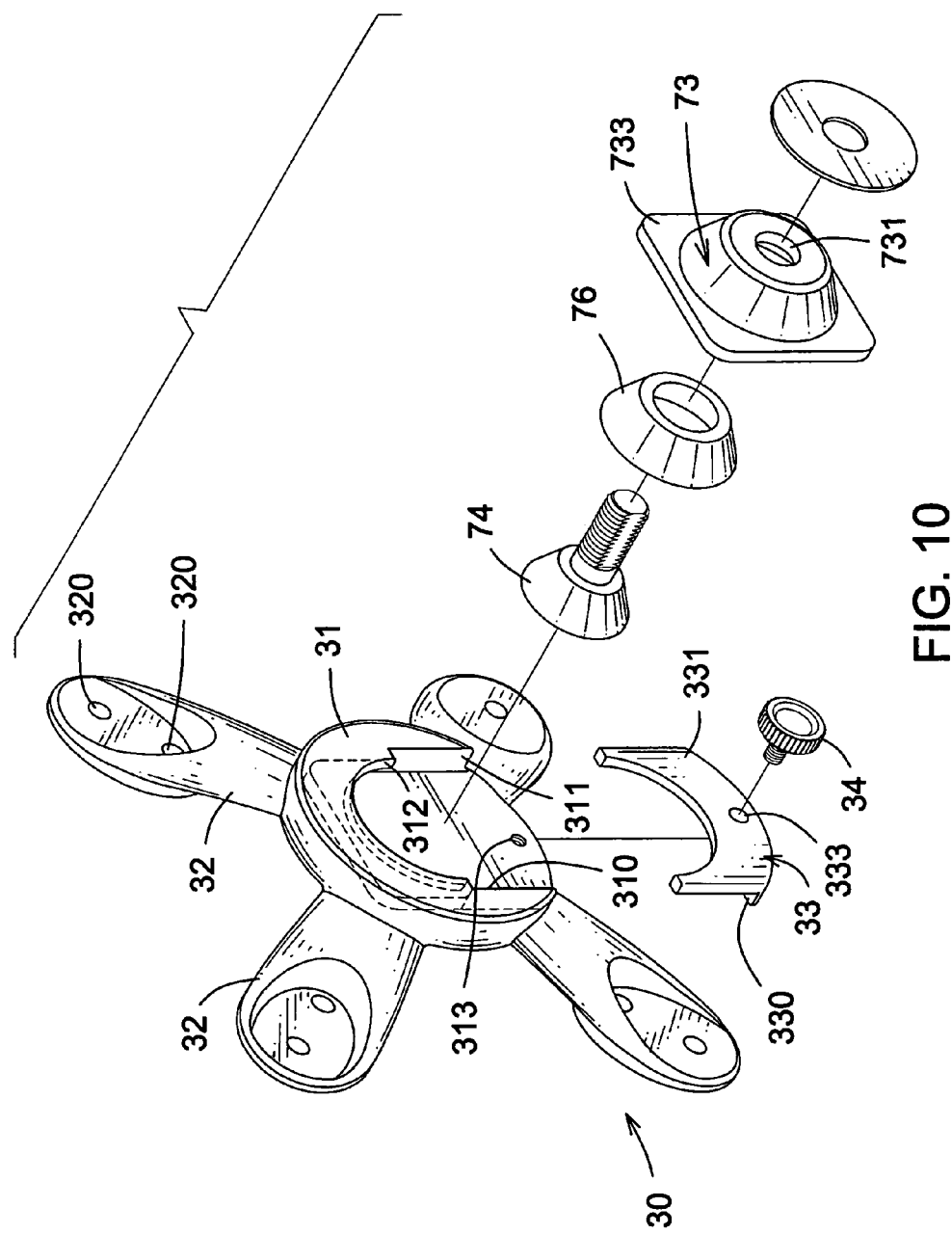
FIG. 10 is an exploded perspective view of the monitor bracket in FIG. 9.

With further reference to FIG. 10, the connector bracket (73) is connected to the outside surface of the transverse member (721) and has an annular sidewall, an inside wall and an outside flange (733) and a mounting hole (731). The annular sidewall has an outside end and an inside end. The inside wall is formed on and encloses the inside end of the annular sidewall and abuts the transverse member (721) of the outer joint (72). The outside flange (733) is keyed and protrudes outward from the outside end of the annular sidewall. The mounting hole (731) is defined through the inside wall.

The fastener securely attaches the connector bracket (73) to the transverse member (721) of the outer joint (72). The fastener may be a bolt (74) with a nut (75) and a lock washer (76). The bolt (74) is mounted through the mounting hole (731) in the connector bracket (73) and the mounting hole in the transverse member (721) of the outer joint (72). The nut (75) screws onto the bolt (74) and abuts the inside surface of the transverse member (721) of the outer joint (72). The lock washer (76) is mounted around the bolt (74).

Figure 11:
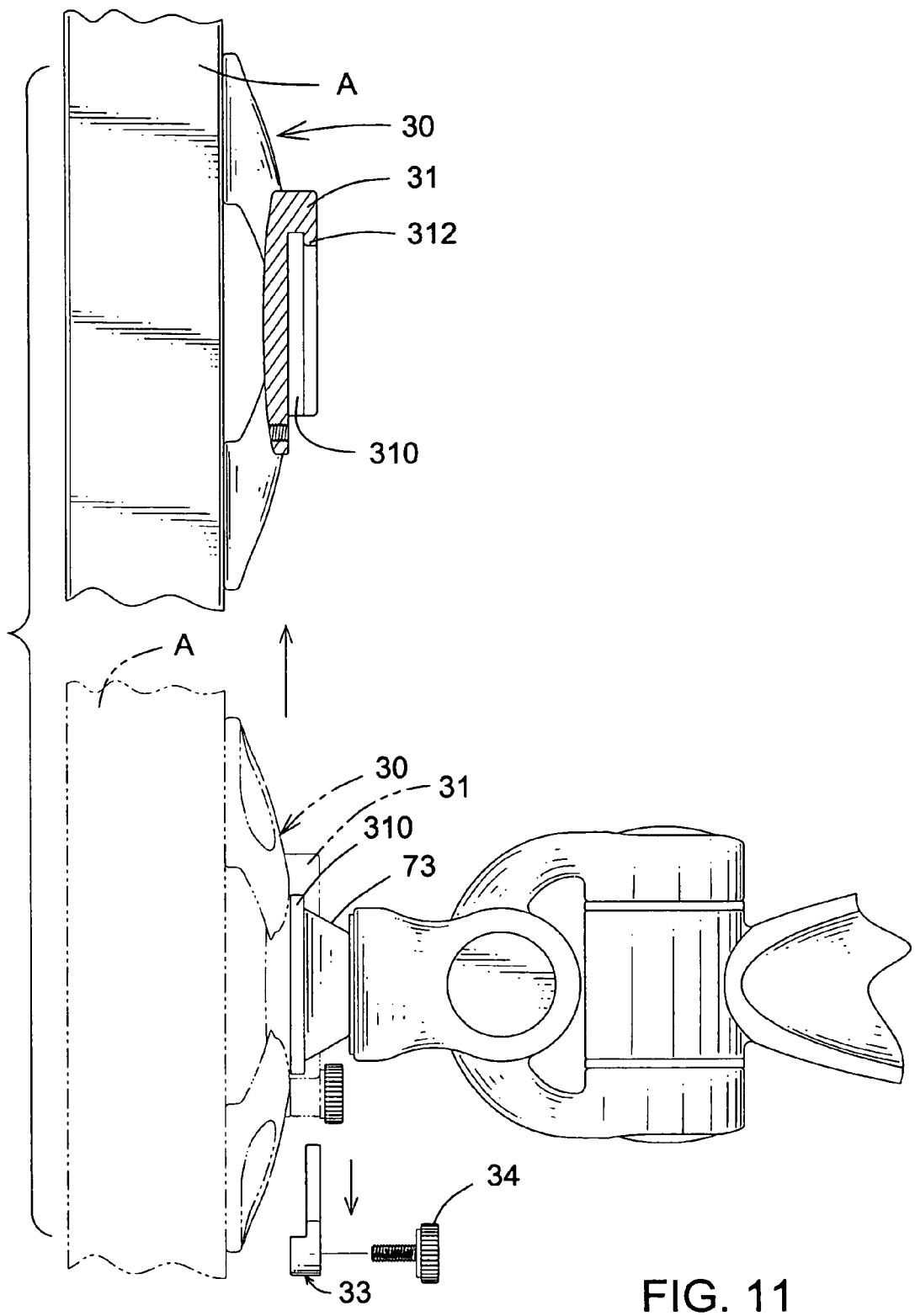
FIG. 11 is an operational side view in partial section of the monitor bracket in FIG. 10 with a monitor detached from the monitor connector of the universal joint.

With reference to FIG. 11, the monitor bracket (30) is connected detachably to the universal joint (70) and has a monitor connector (31), multiple fingers (32), a lock (33) and a knob (34).

The monitor connector (31) is connected detachably to the connector bracket (73) and has an open inside end, an annular sidewall, an open slot (310), a semicircular lip (312) and a threaded hole (313). The open inside end faces the connector bracket (73). The open slot (310) is defined transversely in the annular sidewall, communicates with the open inside end of the monitor connector (31), engages detachably the outside flange (733) of the connector bracket (73) and has an inner surface and an opening (311). The semicircular lip (312) protrudes inward from the annular sidewall and covers a part of the open slot (310). The threaded hole (313) is defined longitudinally through the monitor connector (31) in the open slot (310).

The fingers (32) protrude out from the annular sidewall of the monitor connector (31) and are attached to a monitor (A), and each finger (32) has at least one mounting hole (320) defined through the finger (32). Multiple screws extend respectively through the mounting holes (320) and screw into the monitor (A), so the fingers (32) securely hold the monitor (A).

The lock (33) is connected detachably to the inner surface of the open slot (310) in the monitor connector (31) and has a sidewall extension (330), a semicircular lip (331) and a through hole (333). The sidewall extension (330) is mounted in the open slot (310), abuts the annular sidewall and closes the opening (311) in the monitor connector (31). The semicircular lip (331) protrudes perpendicularly from the sidewall extension (330) and engages the semicircular lip (312) on the monitor connector (31) to form a circular lip to securely attach the outside flange (733) to the connector bracket (73). The though hole (333) is defined through the semicircular lip (331).

The knob (34) is connected detachably to the lock (33) and the monitor connector (31) and has a bolt formed on the knob (34), mounted through the through hole (333) and screwing into the threaded hole (313) in the monitor connector (31).

The monitor (A) with the monitor bracket (30) can be easily detached from or attached to the universal joint (70) with the connector bracket (73) without detaching the whole monitor holding device so mounting and removing the monitor is convenient. Furthermore, the rotating limits (43) of the elbow joint (40) prevent the outer arm (20) and the inner arm (10) from pivoting excessively with each other and prevent the inner arm (10) and outer arm (20) from rubbing against each other. Therefore, the monitor holding device is durable.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A monitor-holding device comprising
a vertical support having a top end, a bottom end and a clamp attached to the bottom end of the vertical support;
a shoulder joint attached to the top end of the vertical support;
an inner arm connected pivotally to the shoulder joint and having a distal end and a proximal end attached pivotally to the shoulder joint;
an elbow joint attached rotatably to the distal end of the inner arm;
an outer arm connected to the elbow joint, pivoting relative to the inner arm and having
   a proximal end attached pivotally to the elbow joint; and
   a distal end;
a universal joint attached pivotally to the distal end of the outer arm and having
   an inner joint connected pivotally to the distal end of the outer arm;
   an outer joint connected pivotally to the inner joint, pivoting perpendicular to the inner joint and having
      a transverse member having
         an inside surface facing the inner joint; and
         an outside surface opposite to the inside surface; and
      a mounting hole defined longitudinally through the transverse member;
   a connector bracket connected to the outside surface of the transverse member and having
      an annular sidewall having an outside end; and an inside end;
      an inside wall formed on and enclosing the inside end of the annular sidewall and abutting the transverse member of the outer joint;
      an outside flange being keyed and protruding outward from the outside end of the annular sidewall; and
      a mounting hole defined through the inside wall; and
      a fastener securely attaching the connector bracket to the transverse member of the outer joint; and
a monitor bracket connected detachably to the universal joint and having
   a monitor connector connected detachably to the connector bracket and having
      an open inside end facing the connector bracket;
      an annular sidewall;
      an open slot defined transversely in the annular sidewall, communicating with the open inside end of the monitor connector, engaging detachably the outside flange of the connector bracket and having an inner surface and an opening;
      a semicircular lip protruding inward from the annular sidewall and covering a part of the open slot; and
      a threaded hole defined longitudinally through the monitor connector in the open slot;
   multiple fingers protruding out from the annular sidewall of the monitor connector, and each finger having at least one mounting hole defined through the finger;
   a lock connected detachably to the inner surface of the open slot in the monitor connector and having
      a sidewall extension mounted in the open slot, abutting the annular sidewall and closing the opening in the monitor connector;
      a semicircular lip protruding perpendicularly from the sidewall extension and engaging the semicircular lip on the monitor connector to form a circular lip to securely attach the outside flange to the connector bracket; and
      a through hole defined through the semicircular lip; and
   a knob connected detachably to the lock and the monitor connector and having a bolt formed on the knob, mounted through the through hole and screwing into the threaded hole in the monitor connector.

2. The monitor-holding device as claimed in claim 1, wherein:
the distal end of the inner arm has a pivot sleeve having two ends;
   a pivot hole defined through the pivot sleeve;
   two recesses defined respectively in the ends of the pivot sleeve and communicating with the pivot hole, and each recess having an annular inside surface; and
   two keys formed respectively on the annular inside surfaces of the recesses;
the elbow joint is mounted rotatably through the pivot sleeve of the inner arm and has
   two rotating limits rotatably mounted respectively in the recesses in the pivot sleeve of the inner arm, and each rotating limit being ring-shaped and having
      an outside surface;
      a keyed inside surface;
      a mounting hole defined through the rotating limit; and
      a protrusion formed on the outside surface and abutting the key in the corresponding recess in the pivot sleeve to stop the rotating limit from rotating any further; and
   a pivot pin mounted through mounting holes in the rotating limits, mounted rotatably through the pivot hole in the pivot sleeve of the inner arm and having
      two ends;
      a keyed outside surface corresponding to the keyed inside surfaces of the rotating limits;
      an enlarged head formed on one end of the pivot pin;
      a threaded hole defined in the other end of the pivot pin; and
      a mounting bolt having an outer thread and screwing into the threaded hole in the pivot pin;
the outer arm is V-shaped and is mounted securely around the pivot pin of the elbow joint;
the proximal end of the outer arm is open and has an upper pivot ring and a lower pivot ring aligned with each other, mounted securely around the pivot pin and adjacent respectively to the ends of the pivot sleeve on the inner arm, and each pivot ring has an outside end and a pivot hole defined through the pivot ring and allowing the pivot pin to extend through the pivot hole.

3. The monitor-holding device as claimed in claim 2, wherein each pivot ring has a keyed inside surface corresponding to the keyed outside surface of the pivot pin.

4. The monitor-holding device as claimed in claim 2, wherein each pivot ring further has
   an outside recess defined in the outside end of the pivot ring, communicating with the pivot hole and having a keyed inside surface; and
   a keyed washer mounted securely in the outside recess in the pivot ring on the outer arm and having
      a central hole mounted around the pivot pin of the elbow joint;

a keyed inside surface corresponding to and mounted around the keyed surface of the pivot pin; and a keyed outside surface corresponding to and mounted around the keyed inside surface in the outside recess.

5. The monitor-holding device as claimed in claim 2, wherein the inner arm further has two stationary washers securely mounted respectively in the recesses in the pivot sleeve of the inner arm, and each stationary washer has an outside surface, a pivot hole defined through the stationary washer and a notch defined in the outside surface and engaging the key in the corresponding recess in the pivot sleeve on the inner arm.

6. The monitor-holding device as claimed in claim 1, wherein:

the vertical support further has
an outer sleeve having
a bottom end attached to the clamp;
a top end;
a central hole; and
an outer thread formed on the outer sleeve close to the top end;
a pneumatic cylinder being hollow, mounted in the outer sleeve and having a shaft having a distal end, a proximal end held in the pneumatic cylinder with a vacuum force and a pivot tab formed on the distal end of the shaft and having a pin hole defined through the pivot tab;
an inner sleeve mounted in the outer sleeve around the pneumatic cylinder and having
a top end; and
a through hole defined through the inner sleeve;
a compression collar mounted around the inner sleeve between the inner sleeve and the outer sleeve; and
a compression nut mounted slidably around the inner sleeve, screwing onto the outer thread on the outer sleeve, compressing the compression collar and having an inner thread corresponding to the outer thread on the outer sleeve;
the shoulder joint is mounted through the inner sleeve of the vertical support, is connected to the pneumatic cylinder in the outer sleeve and has
a connector connected pivotally to the pivot tab on the shaft of the pneumatic cylinder in the outer sleeve and having
a top;
a bottom;
an inclined top surface;
a threaded hole defined in the top of the connector;
a bottom slot defined transversely through the bottom of the connector and holding the pivot tab on the shaft of the pneumatic cylinder;
a pin hole defined transversely through the connector and communicating with the bottom slot; and
a pin mounted in the pin holes in the connector and the pivot tab on the shaft;
a pivot post mounted in the inner sleeve, abutting the top of the connector and having a bottom inclined surface corresponding to and abutting the top inclined surface of the connector, a through hole defined longitudinally through the pivot post and an annular flange formed around the pivot post and abutting the top end of the inner sleeve; and
a locking bolt mounted in the through hole in the pivot post, screwing into the threaded hole of the connector and having an outer end, an inner end, an enlarged head formed on the outer end and an outer thread formed on the locking bolt at the inner end;
the inner arm is V-shaped and is mounted pivotally around the pivot post of the shoulder joint;
the proximal end of the inner arm has an outer pivot ring and an inner pivot ring aligned with each other and mounted pivotally around the pivot post of the shoulder joint, and each pivot ring has an outside end and a pivot hole defined through the pivot ring; and
the outer pivot ring is held on the pivot post by the enlarged head on the locking bolt.

7. The monitor-holding device as claimed in claim 6, wherein:

the shoulder joint further has a bushing mounted rotatably around the pivot post above the annular flange and having a through hole and a top end having a keyed outside surface; and
each pivot ring of the inner arm further has an outside recess defined in the outside end of the pivot ring, communicating with the pivot hole and having a keyed inside surface corresponding to the top end of the bushing of the shoulder joint.

8. The monitor-holding device as claimed in claim 7, wherein the inner arm further has a spacer mounted around the pivot post of the shoulder joint between the pivot rings on the inner arm and having a central hole through which the pivot post of the shoulder joint extends.

9. The monitor-holding device as claimed in claim 1, wherein:

the fastener is a bolt mounted through the mounting hole in the connector bracket and the mounting hole in the transverse member of the outer joint; and
a nut is screwed onto the bolt and abuts the inside surface of the transverse member of the outer joint.

10. The monitor-holding device as claimed in claim 9 wherein the fastener further has a lock washer mounted around the bolt.

* * * * *